United States Patent [19]

Barbier et al.

[11] Patent Number: 4,653,091
[45] Date of Patent: Mar. 24, 1987

[54] SUPPLY FOR A SUBSCRIBER CONTROL SYSTEM

[75] Inventors: Xavier N. Barbier, Plessis Trevise; Guy A. de Passoz, Lesigny, both of France

[73] Assignee: Societe Anonyme de Telecommunications, Paris, France

[21] Appl. No.: 451,861

[22] Filed: Dec. 21, 1982

[30] Foreign Application Priority Data

Dec. 24, 1981 [FR] France ................................ 81 24196

[51] Int. Cl.⁴ ..................... H04M 3/22; H04M 19/02; H04M 19/06
[52] U.S. Cl. .................................... 379/324; 379/352; 379/373; 379/382
[58] Field of Search .............. 179/18 FA, 18 F, 16 C, 179/16 A, 16 AA, 70, 71, 77, 175.2 C, 175.3 R, 170 J, 18 AH, 99 M, 81 R, 84 R, 170 R; 340/825.06, 825.09; 1/18 AH; 330/29

[56] References Cited

U.S. PATENT DOCUMENTS

| | | | |
|---|---|---|---|
| 3,936,614 | 2/1976 | Suntop | 179/16 EC |
| 3,940,570 | 2/1976 | Goudikian | 179/18 AH |
| 4,002,850 | 1/1977 | Richards et al. | 179/18 AH |
| 4,070,554 | 1/1978 | Rule et al. | 179/175.3 R |
| 4,191,859 | 3/1980 | Sabon | 179/18 FA |
| 4,197,425 | 4/1980 | Secrett et al. | 179/2 BC |
| 4,197,432 | 4/1980 | Tiedt | 179/77 |
| 4,284,853 | 8/1981 | Lechner | 179/18 HB |
| 4,310,725 | 1/1982 | Mehaffey | 179/18 AH |
| 4,319,093 | 3/1982 | Bars | 179/23 |
| 4,385,336 | 5/1983 | Takeshita et al. | 361/42 |
| 4,388,497 | 6/1983 | Scheffler | 179/77 |
| 4,398,064 | 8/1983 | Formosa, Jr. | 179/18 AH |
| 4,425,512 | 1/1984 | Tomooka et al. | 307/138 |

FOREIGN PATENT DOCUMENTS 1762011  2/1979  Fed. Rep. of Germany ........ 179/18 FA Primary Examiner—Gene Z. Rubinson
Assistant Examiner—R. Vaas
Attorney, Agent, or Firm—Holman & Stern

[57] ABSTRACT

The present invention relates to the D.C. supply for a subscriber control system, and consists essentially in supplying the control system from the exchange solely in response to a request, such request being emitted either by the exchange or by the control system, a preamble message being emitted in-line by the control system in order to initialize a communication in the latter case. The invention is applicable to the digitalization of the subscriber's telephone.

5 Claims, 5 Drawing Figures

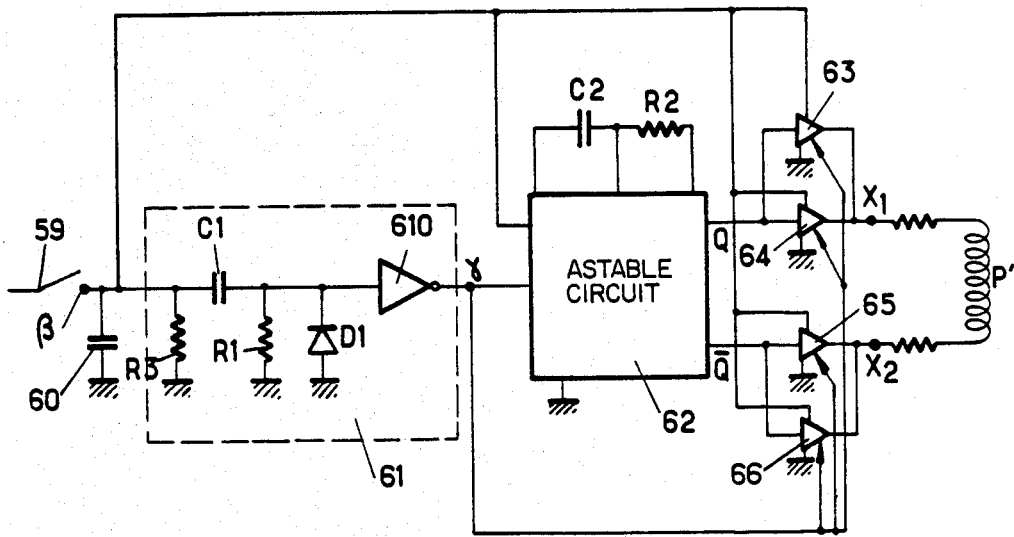
Fig. 4.
Fig. 5.
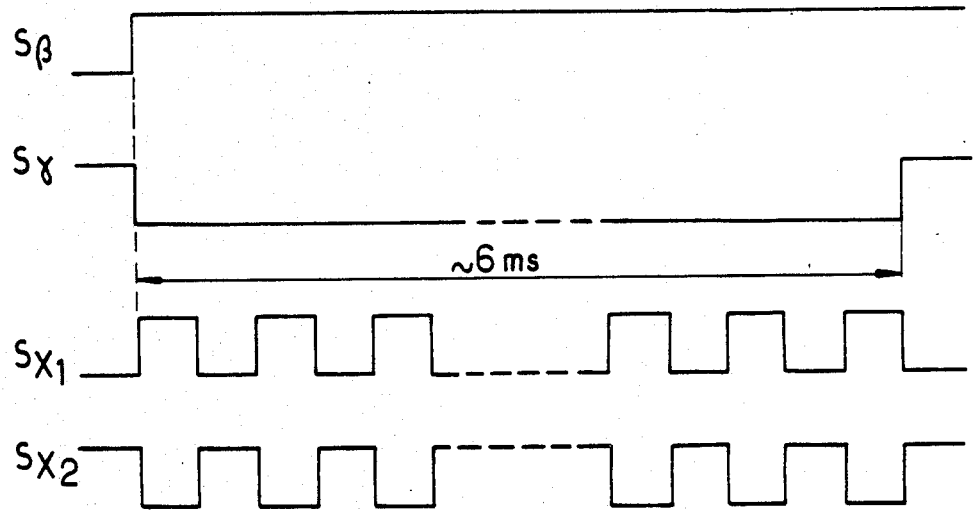

SUPPLY FOR A SUBSCRIBER CONTROL SYSTEM

BACKGROUND OF THE INVENTION

The present invention relates to the digitalization of a subscriber's telephone and more particularly to the supply of such a telephone having regard to the various basic and specific functions attributed thereto.

The basic functions essentially intended to assure the telephone service comprise in particular the supply, call, conversation, reception of call. The specific functions include functions for the telephone service: for example, loudspeaker reception, dialling without lifting the receiver, reply service, dialler of numbers and functions for the new services such as the data transmission, telemetry, remote-alarm services.

To perform these different functions, a terminal, hereinafter called a subscriber control system, allows the telephones and telematic terminals capable of functioning simultaneously, to be connected. The subscriber control system may, for example, be connected to the exchange by means of a two-wire circuit. Such a two-wire circuit makes it possible to arrange high speed data channels in the two directions of transmission.

For known subscriber's telephones of analog type, a central battery supply enables the telephone to operate. Monitoring of the supply current of the telephone allows supervision of the loop state of the subscriber in order to detect, at exchange level, that the subscriber who wishes to make a communication has lifted his receiver (outgoing call). In the case of an incoming call, the subscriber is alerted by the emission of a call current at 50 Hz or 25 Hz which actuates a bell located in the subscriber's premises.

A supply system of central battery type may also be envisaged for the subscriber control system. In the event of the receiver being lifted (outgoing call), it should then allow loop closure. In the event of an incoming call, the conventional method of the signal at 75 V eff (25 or 50 Hz) capable of activating a local bell does not, however, seem to be very compatible with the digital signals transmitted on-line. In fact, the digital signals are of lower amplitude than the analog signals and require considerable protection. The high value of the voltage of the call signal may consequently raise serious problems of protection and interface.

It is an object of the present invention to propose a central supply of the subscriber control system at least as far as the basic functions (telephone) are concerned, and to allow the outgoing or incoming communications to be initialized.

The system being supplied, a simple solution enabling the outgoing and incoming communications to be initialized would consist in transmitting messages between control system and centre of connection of the exchange on the digital information channel.

Such a solution is extremely interesting as it enables the exchange to supervise the state of the subscriber's terminals and in particular to detect at exchange level that the subscriber who wishes to make a communication has lifted his receiver. Thus, the state of the subscriber's telephone may easily be transmitted with the aid of the information output intended for signalization.

However, such a solution would be very expensive energy-wise as it would require a permanent supply of all the subscribers, in order to guarantee the possibility at any moment of signalization information transmission between control system and exchange. Moreover, the risk of disturbance between systems would increase as all the systems would be active simultaneously.

The present invention aims on the one hand at ensuring a supply of the subscriber's telephone from the exchange, and on the other hand at providing this supply solely in response to calls emitted either by the exchange or by the subscriber, to initialize a communication. In the case of an incoming call, in order to initialize the communication, the exchange supplies the control system. When a so-called outgoing call is emitted by a subscriber's telephone towards the exchange, it is necessary to warn the exchange to supply the control system. It is an object of the present invention to generate a so-called preamble message from the control system to warn the exchange to ensure normal supply of the control system.

SUMMARY OF THE INVENTION

According to the invention, the supply for a subscriber control system comprises, on the exchange side, means for supplying direct current, means for controlling said supply and, on the control system side, signalization means capable of initializing a communication (outgoing call).

According to a first feature, said signalization means make it possible to generate a so-called preamble message intended for the exchange.

According to a further feature of the invention, after reception of said preamble message, said means for controlling said supply control the supply of the control system with direct current.

According to another feature of the invention, the preamble message is an inverse current of low value.

According to a variant, the preamble message is a current of predetermined value.

According to another variant, the preamble message is a digital message.

The signalization means of the invention comprise a capacitor charged with an energy limited in voltage by a Zener diode, whatever the state of the control system, said capacitor supplying a preamble message generator.

The invention provides considerable savings in energy consumption during a state of rest.

The invention provides a simple system for generating preamble messages.

The invention, by allowing the transmission means to remain in state of rest in the absence of communication, consequently reduces the risks of cross-talk between the transmission means connecting the control systems to the exchange.

BRIEF DESCRIPTION OF THE DRAWINGS

The invention will be more readily understood on reading the following description with reference to the accompanying drawings, in which:

FIG. 4 shows the astable circuit of FIG. 3 in detail.

FIG. 5 is a timing chart of signals present in the astable circuit of FIG. 3.

DETAILED DESCRIPTION OF A PREFERRED EMBODIMENT OF THE INVENTION

Figure 1:
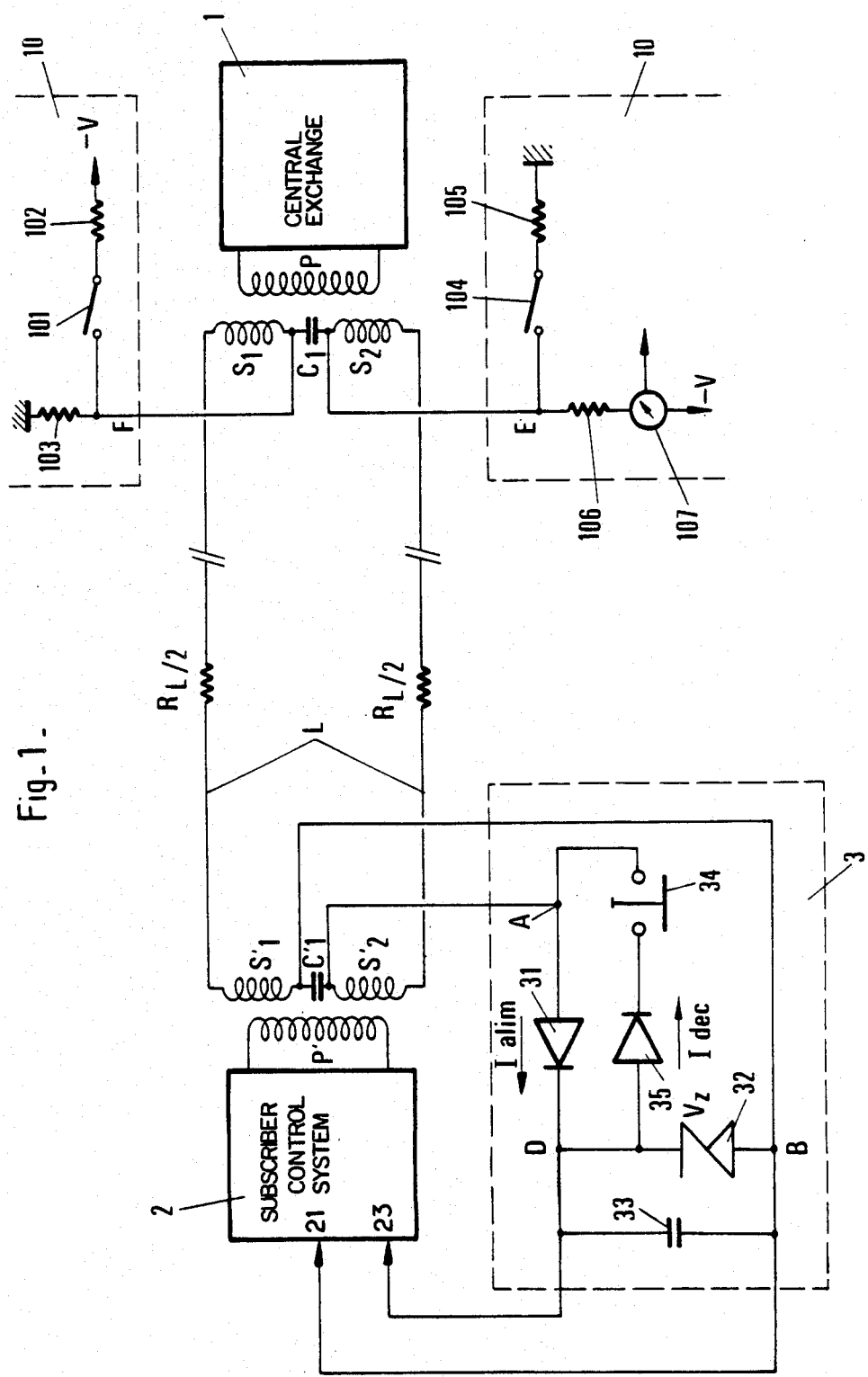
FIG. 1 shows a device for supervising the loop state of the telephone receiver.

Referring now to the drawings, and firstly to FIG. 1, the exchange 1 is connected to the transmission line L via a primary winding P, associated with two secondary windings $S_1$, $S_2$ separated by a capacitor $C_1$. On the other side of the transmission line L, formed by two low-resistance wires, is arranged an equivalent system formed by two secondary windings $S'_1$, $S'_2$ separated by a capacitor $C'_1$. The control system 2 is connected to the terminals of the winding P' associated with the secondary windings $S'_1$, $S'_2$.

According to the invention, between the terminals of the capacitor $C'_1$ are connected the terminals A and B of the device 3 for reception of the supply current 1 of subscriber control system 2.

Between point A and a point D located downstream of A with respect to the exchange is connected a diode 31, conducting from A towards D. Between point D and point B is connected a Zener diode 32, conducting from D towards B. In parallel with this Zener diode 32 is connected, between points D and B, a capacitor 33 which ensures filtering of the voltage recovered at the terminals of the Zener diode 32. Between points D and A are mounted the call contact 34, or the call contacts of each terminal, in parallel with the diode 31 and, in series with this contact 34, a diode 35 conducting from D towards A. The two wires, one conducting through A and D, the other through B, are connected to the terminals 21 and 23 of the subscriber control system 2 to furnish it with a supply current $I_{alim}$.

The transmission line L, connected on the control system side to the terminals of the capacitor $C'_1$ and on the exchange side to the terminals of the windings $S_1$ and $S_2$, makes it possible to supply the reception device 3 and also the control system 2 which is connected thereto. To this end, on the exchange side, the line L is connected, through the windings $S_1$ and $S_2$, to the terminals E and F of a battery 10. The capacitor $C_1$ placed between $S_1$ and $S_2$ ensures passage of the digital signals.

Point F is connected to the potential $-V$ via a switch 101 placed in series with a resistor 102. This point F is also connected to earth via another resistor 103. Point E is taken to earth via a switch 104 placed in series with a resistor 105. This same point E is taken to a potential $-V$ via a resistor 106 placed in series with a D.C. detector 107. The values of the resistors 102 and 105 are equal. The values of resistors 103 and 106 are also equal. The value of resistor 102 is much less than that of resistor 103 and, similarly, the value of resistor 105 is much less than that of resistor 106. Switches 101 and 104 control the supply of the line conducting through A and B, on the subscriber side. Thus, the supply current $I_{alim}$ passes through the diode 31 and supplies the subscriber control system 2 whatever the state of the contact 34 of the terminal. The Zener diode 32 is conducting as soon as the supply voltage V has gone beyonds its threshold Vz. The current $I_{alim}$ passing through diode 31 is written:

$$I_{alim} = \frac{V - V_z}{R_L + R_{(102+105)}} \sim 20 \text{ to } 30 \text{ mA}$$

where $R_L$ is the resistance of line L.

Thus, in the case of an incoming call, the exchange controls the supply of the control system 2 by closing switches 101 and 104.

In the case of an outgoing call, switches 101 and 104 are initially open and no current circulates at detector 107, on the exchange side.

As soon as contact 34 of the handset is lifted, the loop is closed and a lift-off current $I_{Dec}$ flows through the diode 35, of the order of:

$$I_{Dec} = \frac{V - V'_z}{R_L + R_{103+106}}$$

where $V'_z$ is the inverse voltage at the terminals of the Zener diode 32 ($V'_z < V_z$).

This inverse lift-off current may be measured on the exchange side by means of the D.C. detector 107. As soon as an inverse lift-off current is detected by detector 107, the exchanger 1 controls the normal supply of the control system 2 by closing switches 101 and 104.

Such a system allows supply by the exchange whatever the state of contact 34 of the terminal. The subscriber's loop state is monitored by simple detection of the reverse current $I_{dec}$ of low value, on the exchange side. The advantage of this solution consists in not providing any permanent rest current.

However, there is a slight drawback in this first embodiment, as the direction of connection of the wires of pair L is not immaterial.

Figure 2:
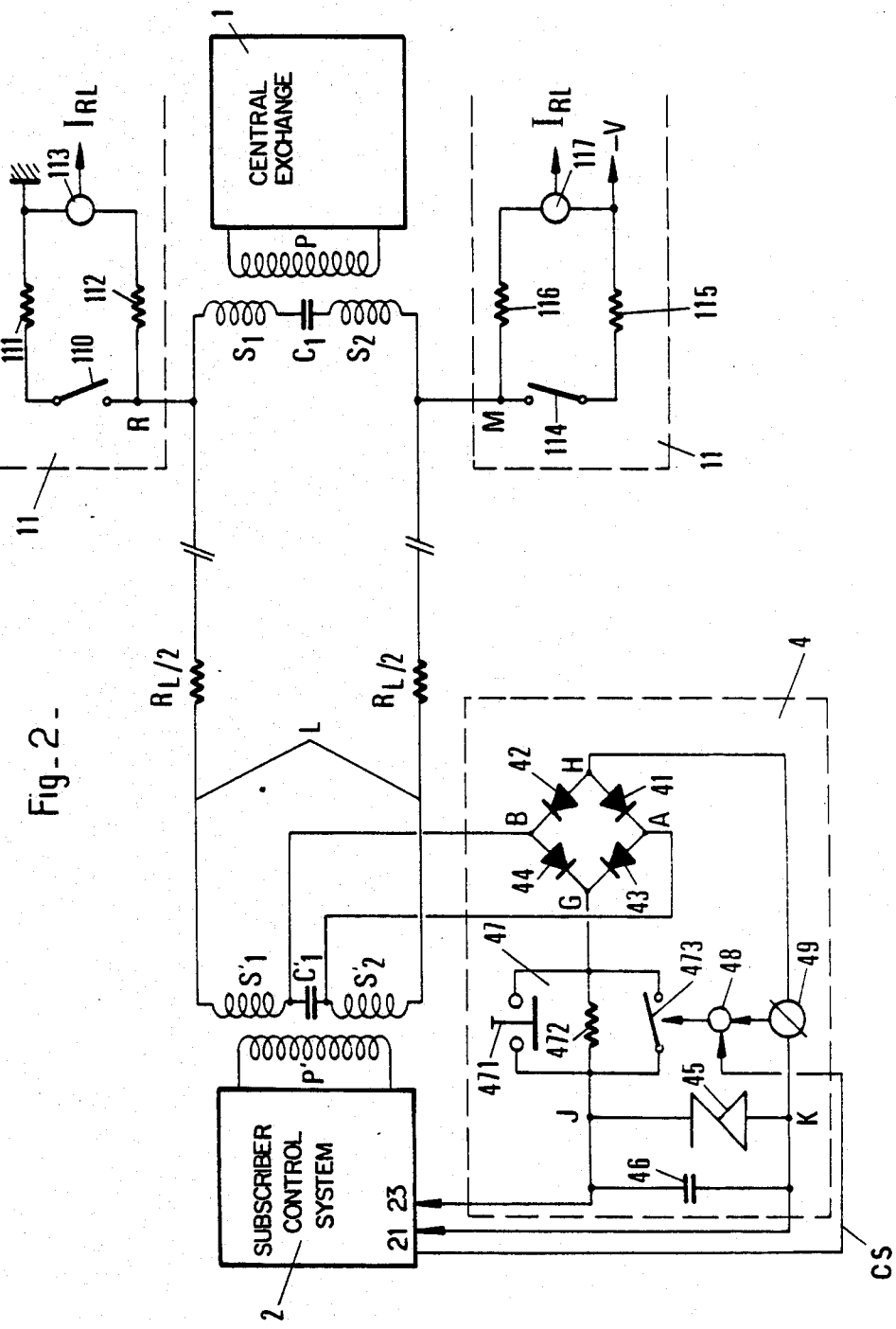
FIG. 2 is a variant of FIG. 1.

Referring now to FIG. 2, the subscriber control system is also supplied by the exchange whatever the state of the subscriber terminal; however, the direction of connection of pair L is immaterial.

In fact, the exchange 1 is connected to line L by means of windings P, $S_1$, $S_2$ and the capacitor $C_1$ in the same way as in FIG. 1. On the control system side, the windings $S'_1$, $S'_2$, P' are also arranged as in FIG. 1. The supervision device of FIG. 2 is essentially distinguished from that of FIG. 1 on the one hand, on the control system side, by a trigger device 4 instead of the device 3 connected to terminals A and B of the capacitor $C'_1$, and, on the other hand, on the exchange side, by a supply circuit 11 and current detection circuit instead of circuit 10 of FIG. 1. The device 4 connected to terminals A and B of capacitor $C'_1$ comprises various elements: between points A and B is placed a rectifier bridge formed by four diodes (41, 42, 43, 44), the two diodes 41, 42 being disposed on one branch, diodes 43 and 44 on the other. For each branch, G and H designate the point located between the two diodes of the bridge. Thus, point G connects the cathodes of diodes 43 and 44, whilst H connects the anodes of diodes 42 and 41. Between these points G and H are connected the two supply wires for subscriber control system 2.

A Zener diode 45 is connected between the two wires passing through G and H, the cathode of said diode being connected at J to the wire passing through point G and its anode being connected at K to the wire passing through H. A capacitor 46 is placed in parallel with this Zener diode 45, between J and K. In addition, an assembly 47 comprising three branches placed in parallel is placed between point J and point G on one of the supply wires of subscriber control system 2. Contact 471 of the terminal is placed on the first branch. A so-called lift-off resistor $R_2$, 472, of suitably chosen magnitude, is placed on the second branch; on the third branch is placed a switch 473 whose function will be described hereinafter. Thus, the two wires passing through G and J, on the one hand, and through H and K, on the other hand, supply the control system with current whatever the state of contact 471 of the terminal. In the event of a plurality of terminals being connected to the control system 2, a plurality of contacts are then connected in parallel with contact 471. The supply wires passing through J and K are respectively connected at 21 (indirectly via switching device 58) and 23 to the subscriber control system 2.

Moreover, in all cases, when the control system 2 is supplied, the latter is connected to the trigger device 4 by means of a signalization channel CS. This signal CS acts on an AND gate 48 which actuates the relay 473 mounted on one branch of the assembly 47. A detector 49, inserted on the supply wire between K and H, also furnishes an indication of current at the input of gate 48.

Between points 21 and 23, the subscriber control system 2 receives a supply voltage recovered at the terminals of the Zener diode 45, this voltage being filtered by the capacitor 46. On the exchange side, a D.C. supply device 11 is inserted in the following manner: the outputs of the secondary windings $S_1$ and $S_2$ are connected to points R and M of this device 11, respectively.

Point R is taken to earth via a switch 110 placed in series with a resistor 111. In parallel with switch 110 and resistor 111 is placed a resistor 112 placed in series with a D.C. detector 113. Point M is connected to potential $-V$ on one branch, via a relay 114 placed in series with a resistor 115, and on the other branch, placed in parallel with the first, via a resistor 116 placed in series with a D.C. detector 117.

The particular structure of FIG. 2 will be more readily understood on reading the working of the device of the invention.

When the control system is being supplied (phase 1), switches 110 and 114 are closed, and on the exchange side, the supply device 11 furnishes the voltage V from the battery to the subscriber control system 2. On the control system side, contact 471 is closed between points J and K of the trigger device 4; a current $I_{alim}$ is available and furnished to control system 2 by means of two supply wires, and is written:

$$I_{alim} = \frac{V - V_Z}{R_1 + R_L}$$

where $V_Z$ is the Zener voltage of the Zener diode 45, where $R_1$ is the supply resistance with $R_1 = 2\ R_{111} = 2\ R_{115}$, and where $R_L$ is the resistance of line L equally distributed on each wire.

This current $I_{alim}$, rising to about 20–30 mA, then passes through contact 471 and the subscriber terminal becomes active.

At rest (phase 2), on the control system side, contact 471 is open, as is contact 473; on the exchange side, the contacts 110 and 114 of the supply device 11 are also open. A so-called rest current still supplies the control system by passing through resistors 112 and 116 ($R_{112} = R_{116} = R_2/2$). This rest current is written:

$$I_{rep} = \frac{V - V_Z}{2\ R_2 + R_L} \sim 1\text{ mA}$$

where $$R_2 = R_{112} + R_{116} = R_{472'}$$

$R_L$ is the resistance of the transmission line,
$V_Z$ is the voltage of the Zener diode 45, and
V is the voltage furnished by the supply device 11.

In a third phase, let us assume that, the device being in the state of rest of phase 2, the subscriber wishes to establish an "outgoing" communication. He operates his terminal which then closes contact 471; a current $I_{dec}$ is then established. This current, which may be measured on the exchange side by means of detectors 113 and 117, is written:

$$I_{dec} = \frac{V - V'_Z}{R_2 + R_L} \sim 2\text{ mA}$$

where $V'_Z$ is the inverse voltage of Zener diode 45.

The exchange 1, as soon as the modification of current $I_{alim}$ into $E_{Dec}$ is detected, controls the closure of contacts 110 and 114, which allows the subscriber control system 2 to be supplied with the normal supply current $I_{alim}$.

In the same way, in the case of an incoming call, the exchange 1 controls closure of contacts 110 and 114, which modifies the current, from $I_{Rep}$ to $I_{Dec}$. On the control system side, this current passes through resistor 472. This current $I_{Dec}$ is detected by the device 49 which sends a signal onto gate 48 which controls the closure of contact 473. Consequently, the current between J and K applied to terminals 21 and 23 of control system 2 becomes $I_{alim}$, i.e. the supply current of phase 1. At the end of communication, two cases are possible: either exchange 1 wishes to suspend the communication, or it is control system 2 which wishes to.

Let us assume in a first case (case a) that the exchange wishes to suspend the communication. In that case, it sends a signalization message onto the digital signalization channel CS which controls the opening of contact 473. The current $I_{alim}$ becomes $I_{dec}$. The exchange then controls the opening of contacts 110 and 114, which modifies the current emitted in-line, which becomes $I_{rep}$, of phase 2.

Let us assume in a second case (case b) that it is the control system which wishes to suspend the communication; in that case, it transmits in-line on the signalization channel CS a digital message requesting suspension of supply and it controls the opening of contact 473. The exchange 1, after having received the message, controls the opening of contacts 110 and 114, which also modifies the current into $I_{rep}$ (phase 2).

Such a device demonstrates the ease of a central supply, with central control and solely as a function of the needs of the subscriber terminal. In practice, if the supply voltage V furnished by the battery 11 rises to 48 Volts of maximum voltage, exchange side, there are 6 to 8 Volts of user voltage, terminal side, when the terminal is located at the end of a line, at about 4 km and is traversed by a current of 35 mA.

However, such a mode of operation involves a weak rest current, of the order of a milliampere, for each line of subscriber terminal.

Figure 3:
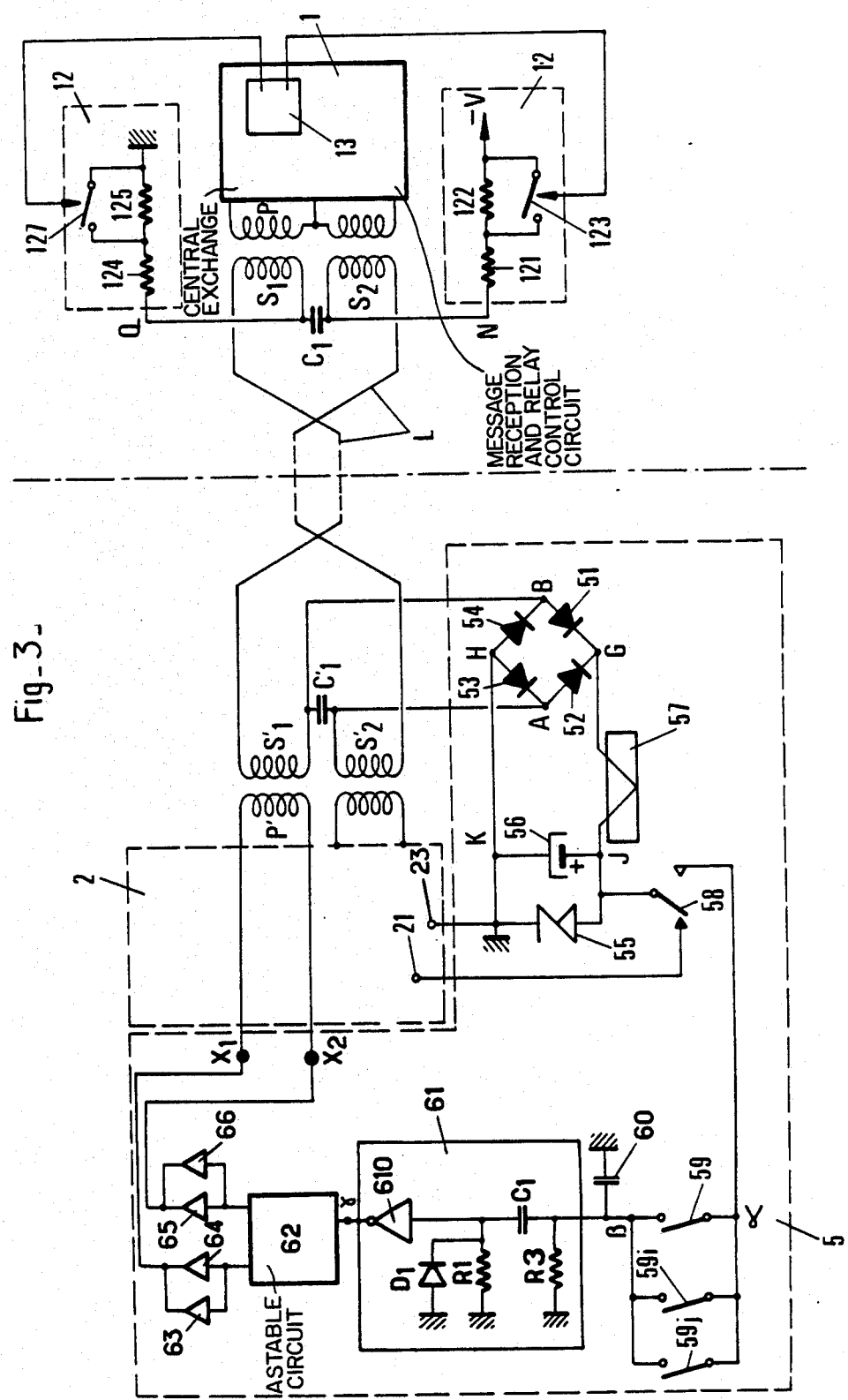
FIG. 3 shows a preferred embodiment of the variant of the invention of FIG. 2.

FIG. 3 shows in detail the preferred device of the invention, also with central supply, controlled on the exchange side and not providing permanent rest current. The exchange 1 is connected to the control system 2 in the same way as in FIGS. 1 and 2, by means of the windings $S_1$, $S_2$, $S'_1$, $S'_2$, the capacitors $C_1$ and $C'_1$ and line L.

A supply device 12 is connected on the exchange side to terminals N and Q of capacitor $C_1$. Point Q is taken to earth via two resistors 124 and 125. A relay contact 127 is placed in parallel with resistor 125. Point N is taken to potential −V (for example equal to −48 Volts) via the resistors 121 and 122. In the same way, a relay contact 123 is placed in parallel with this resistor 122.

On the control system side, terminals A and B of capacitor C′$_1$ are connected to a reception device 5. This device 5 comprises a rectifier bridge with diodes distributed over two branches, diode 53 in series with diode 54 for one, diode 52 in series with diode 51 for the other. Point H, disposed between diodes 53 and 54, is connected to the anodes of these two diodes 53, 54. Point G, disposed between diodes 51 and 52, is connected to the cathodes of these two diodes 51 and 52. Between points H and G are respectively connected points K and J which are connected to the terminals of a capacitor 56. In parallel with this capacitor 56 is mounted a Zener diode 55 whose cathode is connected to point J. Point K is taken to earth. Between point G and point J is disposed a current detector device 57, for example a relay, which acts on a switching device 58 connected to point J. This switching device 58, symbolized in FIG. 3 as a switch, is capable of taking two positions: one to connect point J to point α, the other to connect point J to terminal 21 of control system 2. In this latter position, the control system is then supplied between the terminal 21 connected to J and the terminal 23 connected to the local earth (K).

Between point α and a point β located in front of α are placed N contacts of subscriber terminals in parallel, of which the contacts $(59_i)_1 \leq i \leq N$ are shown in FIG. 3. Point β is connected to the input of a monostable circuit 61. This monostable circuit 61 essentially forms, with an astable circuit 62, a call sequence emission device. This call sequence emission device is supplied upon closure of contact 59 due to the energy stored in capacitor 56.

Between the monostable circuit 61 and point β is interposed a capacitor 60 of which the other terminal is taken to earth. The monostable circuit 61 comprises an RC circuit formed by a capacitor C$_1$ placed in series with a resistor R$_1$ in which the capacitor C$_1$ discharges. The other terminal of resistor R$_1$ is taken to earth, whilst capacitor C$_1$ is connected at its other terminal to point β. In parallel with this resistor R$_1$ is placed a diode D$_1$ rendered conducting from earth towards R$_1$.

The function of this diode is to eliminate the negative peak appearing at the cut-off of the voltage applied at β. An inverter amplifier 610, with threshold device, is connected to the terminal common to R$_1$ and C$_1$ and furnishes a signal Sγ. As shown in FIG. 4, this monostable circuit 61 also comprises a bias resistor R$_3$ placed between point β and earth. The value of this resistor R$_3$ is very high with respect to that of R$_1$. The output of this monostable circuit 61 therefore furnishes a signal Sγ of appropriate width determined in particular by the value of capacitor C$_1$ and of resistor R$_1$. About 0.1 μF is chosen for example for C$_1$, whilst the resistor R$_1$ is chosen to be of the order of 82 kΩ. A pulse of width of 6 ms to 10 ms is thus obtained for signal Sγ. The closure of a contact 59$_i$ allows both the supply of monostable circuit 61 and the formation of signal Sγ for calibration of the call sequence. This signal Sγ is applied to the "validation" input of an astable circuit 62 furnishing a train of pulses calibrated by a capacitor C$_2$ and a resistor R$_2$. This astable circuit 62 is supplied with energy directly by a connection to point β and may then furnish on its outputs Q and $\overline{Q}$ pulse trains controlled by the square wave signal Sγ. A frequency of the order of 20 kHz is chosen for example for the pulse train. The output Q of this astable circuit 62 is connected to the inputs of two amplifiers 63 and 64 mounted in parallel. These amplifiers have two states: state 0 and state 1, which are low impedance states, and "high impedance" state. To this end, these amplifiers receive the signal Sγ directly from point γ and are also connected to earth. These amplifiers are supplied directly from point β. In this way, for the whole duration of the square wave determined by Sγ, the outputs of amplifiers 63 and 64 furnish in low impedance pulses formed from amplified 1 and 0. As soon as Sγ is in state 1, these outputs pass again to high impedance. In the same way as amplifiers 63 and 64, two amplifiers 65 and 66 mounted in parallel process the signal obtained on output $\overline{Q}$ of the astable circuit 62 and form a signal S×2 in phase opposition with signal S×1.

The outputs of amplifiers 63 and 64 are connected to those of amplifiers 65 and 66 via a winding P′. The current circulating in the winding P′ between points X$_1$ and X$_2$ is the preamble signal as shown in the chart of FIG. 5. It is in the form of a sequence of pulses for the whole duration during which the signal Sγ is in state 0. Then S×1 and S×2 pass again into the high impedance state as soon as Sγ is in state 1. Referring again to FIG. 3, the winding P′ transmits this signal to the terminals of the winding S′$_1$ then on line L towards exchange 1.

A device 13 for receiving the digital messages from the control system 2 is also provided on the exchange side. After decoding the messages, as will be explained hereinafter, this device 13, inserted in exchange 1, is capable of controlling closure of relays 123 and 127.

The functioning of the various members of FIG. 3 explains the structure thus described.

When exchange 1 wishes to supply the control system to call one of the terminals, number i for example represented by its contact 59$i$, it firstly controls, via the device 13, the closure of relays 127 and 123 in order to supply control system 2. These relays shunt resistors 125 and 122 and the line current then rises to a value of about 25 to 30 mA. This current actuates the detector 57 which acts on switch 58. Point J is then connected to supply point 21 of control system 2. Control system 2 is then supplied between terminals 21 and 23. The desired call of the terminal may then be made by sending messages in the signalization channel CS.

As soon as the control system no longer needs to be supplied, it sends a digital message on-line to the exchange by means of channel CS. Recognition of end of communication message then controls opening of relays 123 and 127. On the control system side, detector 57 detects the absence of line current and allows the switch 58 to return to its initial position (J connected to point α). Control system 2 is then no longer supplied. However, the voltage −V, furnished by the supply device 12, is maintained at the terminals of capacitor C′$_1$ and at terminals K and J of capacitor 56 and thus maintains capacitor 56 charged. A very weak rest current, less than 1 mA, and zero if the losses of the line and of capacitor 56 are zero, allows capacitor 56 to store energy which will be available for control system 2 for emission of the preamble message. This phase is called state of watch.

The call phase of the subscriber corresponds to the following step, control system 2 not being supplied by the exchange, relays 123 and 127 are open, relay 58 is still connected to point α. As soon as the subscriber wishes to make a call (outgoing call), he lifts his receiver and closes contact 59$i$. Point α is then supplied by the energy stored during the watch phase by capacitor 56. The astable circuit 62 is then live and may emit a digital message transmitted by the winding P', then in-line by the control system. The message is received by the exchange, detected by device 13 which transmits to relays 127 and 123 an order of closure. The line is then supplied by a line current which, upon reception by device 5, triggers the detector 57. This detector 57 actuates switch 58 which is thus connected to point 21 and the control system 2 is then supplied.

Such a trigger device 5 allows the emission of a preamble message towards the exchange and allows the supply of control system 2 in response to a request coming from one of the terminals connected to the subscriber control system.

The device according to the invention allows the control system 2 and possibly the telematic terminal 59 to be supplied, independently of the direction of connection of the pair forming line L.

What is claimed is:

1. In a telephone network, a device for supplying current from an exchange to a subscriber control system having plural states and terminals, said device comprising: supply means for supplying said subscriber control system with direct current, control means for controlling said supply means, and signalization means for initializing a communication, said signalization means comprising a capacitor connected to the terminals of said subscriber control system, Zener diode means for limiting the voltage across said capacitor irrespective of the state of the subscriber control system, and a preamble message generator for sending a preamble message to said exchange in the form of an inverse current of low value, said preamble message generator being supplied with power from said capacitor.

2. Device according to claim 1, wherein said control means has two outputs and has connected, at one output, a series circuit of a switch and a first resistor connected in parallel with a series circuit of a second resistor and a first direct current detector, and, connected at the other output, a series circuit of a switch and a third resistor connected in parallel with a series circuit of a fourth resistor and a second direct current detector.

3. Device according to claim 1, wherein said signalization means comprises at least a terminal contact, a lift-off resistor and a switch connected in parallel between said zener diode and said message generator, said message generator including four diodes forming a rectifier bridge, said device further comprising a signalization channel and a current detector for controlling said switch.

4. Device according to claim 1, wherein said control means for controlling said supply means has two outputs and has connected, at each output, a first resistor and a second resistor, which is connected in parallel with a switch, and further comprising preamble message receiving means for controlling said switch.

5. Device according to claim 1, further comprising a call sequence emitting device comprising a monostable circuit and an astable circuit connected in series, and wherein said signalization means comprises means for supplying current via said capacitor to said call sequence emitting device.

* * * * *